April 8, 1924.  
B. M. W. HANSON  
GAUGE  
Filed April 16, 1921  
1,489,576
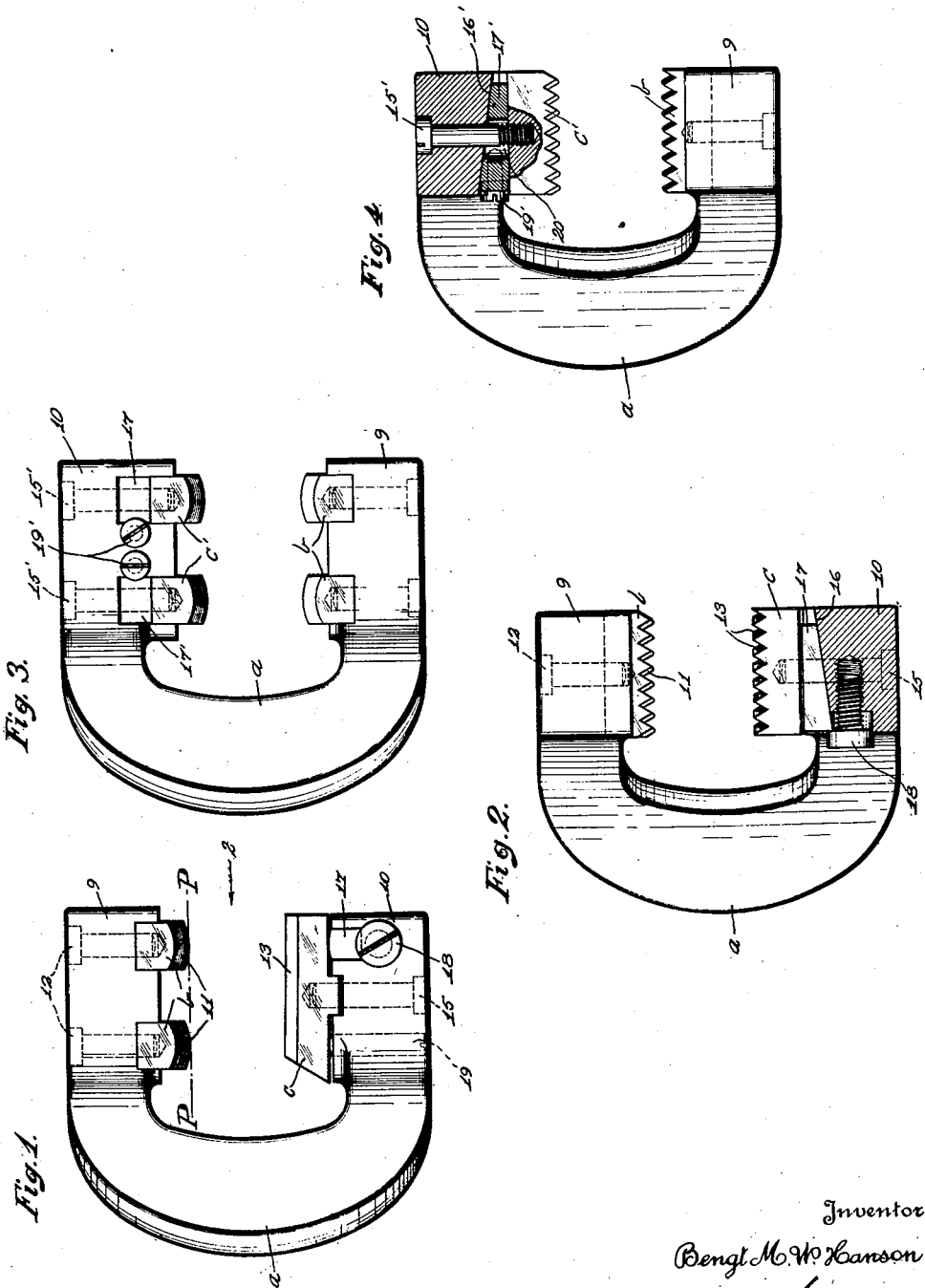
Inventor  
Bengt M. W. Hanson  
H. E. Hart  
By his Attorney Patented Apr. 8, 1924.

1,489,576

UNITED STATES PATENT OFFICE.

BENGT M. W. HANSON, OF HARTFORD, CONNECTICUT.

GAUGE.

Application filed April 16, 1921. Serial No. 461,957.

*To all whom it may concern:*

Be it known that I, BENGT M. W. HANSON, a citizen of the United States, and a resident of Hartford, in the county of Hartford, State of Connecticut, have invented certain new and useful Improvements in Gauges, of which the following is a specification.

This invention relates to gauges and has peculiar application in gauges for screw threaded members. The aim of the invention is to provide a gauge of this sort with which threaded members may be very readily and accurately gauged within predetermined limits of tolerance.

This application is a companion one to my co-pending application Serial No. 461,956, filed April 16th 1921.

In the accompanying drawing:

Fig. 1 is a side view of a gauge constructed in accordance with one embodiment of the invention.

Fig. 2 is a forward end view thereof, looking in direction of the arrow 2 of Fig. 1 and with parts broken away.

Figs. 3 and 4 are views similar to Figs. 1 and 2, respectively, but illustrate another embodiment of my invention.

Referring to that embodiment of the invention shown in Figs. 1 and 2, $a$ is a frame in the form of a C having a pair of heads 9, 10 on the opposed surfaces of which are mounted jaws $b$, $c$. The jaw $b$ comprises a pair of sections spaced one back of the other and each section having an active face in the form of a segment of a screw similar in all respects to the thread to be gauged except that if the gauge is constructed to gauge right hand screw threads, the sections $b$ have serrations or teeth 11 comprising segments of a left hand screw thread. These sections are secured to the head 9 by bolts 12. The jaw $c$ is provided with a plurality of serrations 13, each similar in transverse section to the groove of the thread to be gauged except that the serrations may not be as deep as the groove. These serrations are inclined to the length of the jaw $c$ in accordance with the angle of lead of the thread to be gauged, so that the serrations and the portions of the threaded member in engagement therewith extend in the same direction. The jaw member $c$ is secured to the head 10 by a bolt 15, there being sufficient play between the parts to allow of angular adjustment of the member $c$. Positioned within an inclined groove 16 in the head 10 and extending transversely of the jaw member $c$ is a wedge 17. This wedge is adapted to be longitudinally adjusted by a screw 18 to change the inclination of the jaw $c$ relative to the jaw $b$. The member $c$, adjacent its rear end, is supported by an adjustable screw 19.

The gauge shown in Figs. 1 and 2 is adjusted and used in the following manner. Assuming for purposes of illustration that the guage is particularly constructed for measuring threaded members approximately 1″ in diameter and the specified limits of accuracy for the particular threaded member to be gauged are 1″ and 1″ minus .002, the jaw $c$ is adjusted by means of the wedge 17 and the screw 19 until a threaded test piece having a diameter of exactly .998″ will just fail to pass between the rear section $b$ and the jaw $c$, and a second test piece of exactly 1″ in diameter will just slide past the forward section of the jaw $b$. The taper of the jaws relative to one another between the sections $b$, $b$ will now be equal to the working allowance, namely .002″. The threaded member to be gauged is now inserted between the jaws, and if it can be moved past the high point of the forward section $b$ and not past the high point of the rear section $b$, it is within the limits of tolerance. By holding the gauge between a source of light and the eye and sighting along the serrations or teeth, it can be readily determined whether each of the convolutions of the thread is accurate as to size and shape and also any errors in the pitch of the thread will be made apparent. It is evident that by adjusting the wedge 17 and the screw 19 wear between the jaw faces may be readily taken up and the inclination of these faces relative to one another may be varied in accordance with changes in working allowances. For convenience in terminology the line $p$—$p$ may be taken as indicating the plane of the active surfaces of the section 11—11.

Referring now to the embodiment shown in Figs. 3 and 4, the frame $a$ and the jaw sections $b$ are similar in constructions to like parts of the preceding embodiment. In this embodiment the opposing jaw comprising a pair of sections $c'$, $c'$, similar in construction to the sections of the jaw $b$. Interposed between each of the sections $c'$ and the head 10 of the gauge is a wedge 17′, and these wedges are adapted to be adjusted by the respective screws 19'. From Fig. 4 it will be seen that the bottom surfaces of the grooves 16' in which the wedges are mounted are inclined and the wedges are longitudinally slotted as at 20 to accommodate the securing bolts 15'. It is, of course, understood that the forward section of the jaw c' will be adjustable by means of its wedge 17' so that the distance between the forward section c' and b is equal to the maximum limit of accuracy specified for the member to be gauged, and the rear section c' will be adjusted so that the distance between this section and the rear section b will be equal to the specified minimum limit of accuracy.

It is, of course, obvious that my invention is susceptible of various modifications and changes which are within the spirit of the invention without departing from the scope of the following claims it being understood that the present disclosure of my invention is by way of illustration only and it is not to be taken as restrictive of my conception.

I claim as my invention:—

1. A gauge provided with a pair of opposed jaws, one of which comprises a plurality of sections spaced one behind the other and each section having serrations complementary to the thread to be gauged.

2. A gauge provided with a pair of opposed jaws each provided with a plurality of serrations, one of said jaws comprising a plurality of sections spaced one behind the other, and means for adjusting said jaws relatively to one another to relatively change the angle between the active plane of said sections and the active plane of the other jaw.

3. A gauge provided with a pair of opposed jaws each provided with a plurality of serrations, one of said jaws comprising a plurality of sections spaced one behind the other, and means for adjusting each of said sections relative to the other jaw.

4. A gauge provided with a pair of opposed jaws each of which comprises a pair of sections, each section having serrations complementary to the thread to be guaged, and means for adjusting some of said sections relative to the opposing ones.

5. A gauge provided with a pair of opposed jaws having teeth corresponding to the threads of the member to be gauged, each of which comprises a pair of sections spaced apart longitudinally of the other jaw, and means for adjusting said jaws relative to one another.

6. A gauge provided with a pair of opposed jaws each having teeth corresponding to the threads of the member to be gauged, one of which jaws comprises a pair of sections spaced apart longitudinally of the other jaw, and wedge means for adjusting each of said sections relative to the other jaw.

7. A gauge provided with a pair of opposed jaws one of which comprises a pair of sections spaced apart longitudinally of the other jaw, each section having an active face in the form of a segment of a screw similar to the thread to be gauged with the teeth of the serrations running in a direction opposite to those of the thread.

BENGT M. W. HANSON.